United States Patent [19]

Watanabe et al.

[11] Patent Number: 4,625,147
[45] Date of Patent: Nov. 25, 1986

[54] INDEX TYPE COLOR PICTURE TUBE

[75] Inventors: Naomitsu Watanabe; Yoshifumi Tomita, both of Mobara; Atsushi Suzuki; Hajime Yamamoto, both of Tokyo, all of Japan

[73] Assignee: Hitachi, Ltd., Tokyo, Japan

[21] Appl. No.: 627,760

[22] Filed: Jul. 5, 1984

[30] Foreign Application Priority Data

Jul. 8, 1983 [JP] Japan ................................. 58-123207

[51] Int. Cl.⁴ ........................ H01J 29/20; C09K 11/08
[52] U.S. Cl. ............................... 313/468; 252/301.45; 313/471
[58] Field of Search ....................... 313/467, 468, 471; 252/301.45

[56] References Cited

U.S. PATENT DOCUMENTS

| 2,862,130 | 11/1958 | Sadowsky et al. | 313/467 |
| 3,875,449 | 4/1975 | Byler et al. | 313/468 X |
| 3,878,119 | 4/1975 | Nath | 252/301.45 |
| 4,113,648 | 9/1978 | Ferri et al. | 252/301.45 |

Primary Examiner—Palmer C. DeMeo
Assistant Examiner—Sandra L. O'Shea
Attorney, Agent, or Firm—Charles E. Pfund

[57] ABSTRACT

In an index type color picture tube including a stripe type fluorescent screen having stripe-shaped phosphor layers for green, blue and red color and a stripe-shaped phosphor layer for index detection, the phosphor for red color phosphor layer comprises a $Y_2O_2S$:Eu phosphor containing 0.01 to 3 ppm of either one or both of Tb and Pr.

2 Claims, 2 Drawing Figures

INDEX TYPE COLOR PICTURE TUBE

BACKGROUND OF THE INVENTION

This invention relates to an index type color picture tube, and more particularly a composition of phosphors constituting its fluorescent screen.

FIG. 1 shows a structure of the screen of a one-electron-beam, index type color picture tube. On the rear surface of a front glass 10 are coated red, blue and green, primary tricolor emitting phosphors 11a, 11b and 11c (hereinunder called color phosphors) in vertical stripes with carbon black coated also vertically therebetween as guard bands 12. Over the color phosphors and guard bands is vapor-deposited aluminum to constitute a metal back 13, upon which are further coated postion detecting phosphors 14 (index phosphors) in vertical stripes.

The guard bands 12 are positioned alternately with the stripes at the respective color phosphors so as to be separation bands for preventing color contamination caused by an electron beam exciting two color phosphors simultaneously. The reflection of external light impinging on the front surface of the screen can be reduced as well and there is additionally an effect of improving contrast.

The position detecting phosphors 14 are formed on the metal back corresponding to the guard bands so that an electron beam is not hindered from reaching the respective color phosphors.

As an electron beam from a single electron gun 15 is scanned on the screen, the index phosphors are excited together with the color phosphors and emit light. The light emanated is led out through an index detecting window 16 in the rear funnel of the picture tube and converted into electric signals by an index light detector.

The electric signals provide information pertaining to the relationship between the scanning positions of the electron beam and the positions of the stripes of the color phosphors. The electric signals are pulse signals, too, having a period determined by the pitch of the stripes of the position detecting phosphors, and chrominance signals for red, blue and green are switched by position signals to be supplied to the electron gun in order to excite the stripes of the respective color phosphors and to reproduce a color image.

As described above, the index type color picture tube as shown in FIG. 1 comprises tricolor stripe shaped phosphor layers and a stripe shaped index phosphor layer adapted to show the position of a scanning beam. Used as the tricolor phosphors are a $Y_2O_3$:Eu phosphor for red color, a ZnS:Cu, Al or ZnS:Cu, Au, Al phosphor for green color, and a ZnS:Ag phosphor for blue color. Used as the index phosphor are a $YAlO_3$: Ce phosphor (for emitting ultraviolet rays) having a short after-glow time, a $Y_3Al_5O_{12}$:Ce phosphor (emitting green color) or a $Y_2SiO_5$:Cu phosphor (emitting ultraviolet rays), etc. However, with zinc sulfide type phosphors emitting green and blue colors, their brightness will generally increase substantially linearly with increase in the electron beam current within its low value range, but within the high value range, their brightness will saturate without exhibiting linear increase. Only with the conventional red color phosphor, even in the high current range, there occurs no appreciable saturation phenomenon of the brightness, and the brightness increases linearly as the electron beam current increases.

For this reason, in a color picture tube utilizing such tricolor phosphors, a white color picture becomes more reddish in the high current range than in the low current range, thus degrading uniformity of whiteness. With a shadow mask type color picture tube having three electron guns corresponding to the tricolor phosphors, this problem can be solved relatively simply by correcting characteristics of the associated electric circuits, but in the index type color picture tube without a shadow mask, having a single electron gun, it has been extremely difficult to take advantage of such a countermeasure.

SUMMARY OF THE INVENTION

It is therefore an object of this invention to provide a novel index type color picture tube capable of improving uniformity of whiteness.

According to this invention, there is provided an index type color picture tube including a stripe type fluorescent screen having stripe-shaped phosphor layers for green, blue and red color and a striped-shaped phosphor layer for index detection, wherein the phosphor for the red color phosphor layer comprises a $Y_2O_2S$:Eu phosphor containing 0.01 to 3 ppm of either one or both of Tb and Pr.

DESCRIPTION OF THE PREFERRED EMBODIMENT

To solve the problem of the whiteness of the reproduced picture, it has been studied to practice green and blue color phosphors having less tendency to saturation even in the high current range, but it still remains unsolved to obtain green and blue color phosphors comparable with the zinc sulfide type phosphors pointed out hereinabove from the standpoint of brightness and color tones of the phosphors. In contrast to the conventional direction of study, the present inventors have made various positive investigations on red color phosphors capable of mainfesting substantially the same brightness saturation characteristic as the zinc sulfide type phosphors and have found that this object can be obtained by reducing the quantity of impurities Tb and Pr, added to the conventional $Y_2O_2S$:Eu red phosphor by an amount of about 5 to 30 ppm for the purpose of improving the brightness, to only 0.01 to 3 ppm. If the impurity concentration is excessively large, the current-brightness characteristic would lack brightness saturation like the prior art red color phosphor, whereas if it is excessively small, the brightness itself would be deficient.

Figure 1:
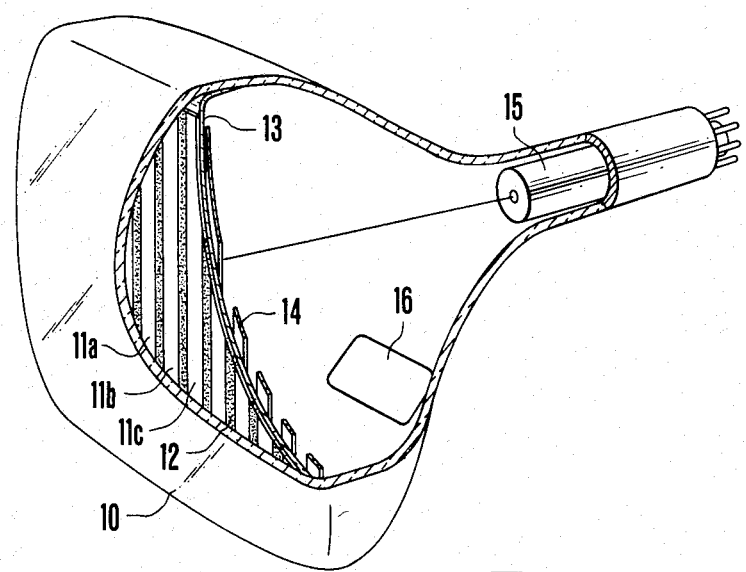
FIG. 1 shows a typical index type color picture tube.
Figure 2:
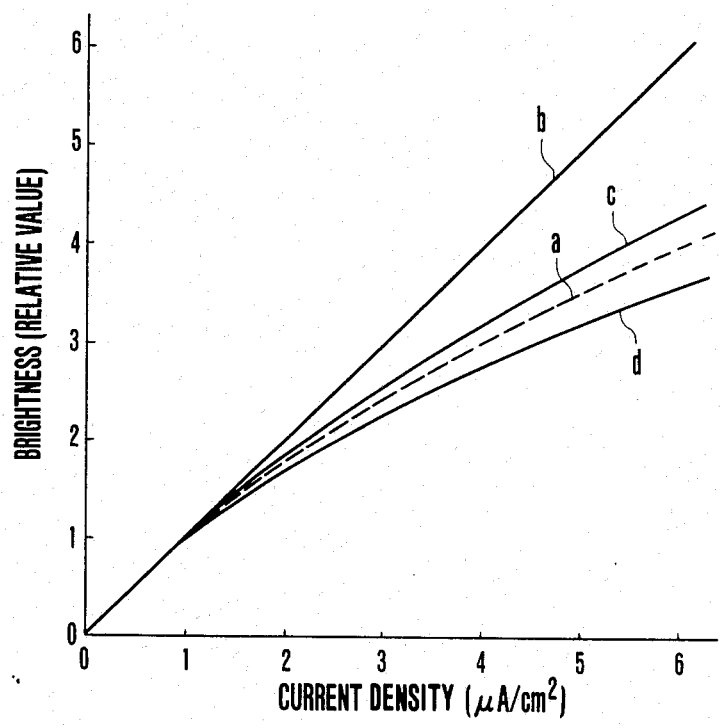
FIG. 2 is a graph showing current-brightness characteristics of phosphors.

The invention will now be described in detail with reference to FIG. 2 showing the current-brightness characteristics. A conventional 1.5-inch type color picture tube is prepared which has a fluorescent screen coated with conventional ZnS:Cu, Au, Al green color phosphor, ZnS:Ag blue color phosphor, and $Y_2O_2S$:Eu red color phosphor. A color picture tube of the same type is prepared which has a fluorescent screen coated with the same green and blue color phosphors and a $Y_2O_2S:Eu$ red color phosphor embodying the invention. Current-brightness characteristics of the thus prepared color picture tubes are measured at an accelerating voltage of 7.5 KV within a luster scanning area of 5.7 cm$^2$. Brightness of each phosphor is expressed by a percentage relative to reference brightness at a current density of 1 μA/cm$^2$. As can be noted from the drawing, the red color phosphor of this invention shown by curve a manifests a brightness greatly different from that of the conventional red color phosphor shown by curve b and manifests similar brightness saturation characteristics to those of the prior art green and blue color phosphors shown by curves c and d. Thus, it has been proven that with the fluorescent screen of the present invention, a reproduced white color picture image has substantially uniform white color tone over the range of from low current to high current.

An example of preparing the red color phosphors according to this invention is as follows.

Amounts of 72.2 g of $Y_2O_3$ having a purity of five nines and 4.22 g of $Eu_2O_3$ having a purity of three or four nines are dissolved in nitric acid, and then a suitable quantity of $Tb(NO_3)_3$ solution is added to the nitric acid solution. The term "suitable quantity" means that Tb is contained by a quantity of an atomic number ratio of $3 \times 10^{-7}$ (0.3 ppm) with respect to the total number of cations (sum of the Y ions and Eu ions). To determine the quantity of added Tb, it is essential to measure beforehand the concentrations of Tb and Pr contained in the raw material particularly $Y_2O_3$. The method of measuring will be described later in detail.

Then, 150 g of oxalic acid is dissolved in 330 cc of ion exchange water. The mixed solution of $Y_1Eu$ and Tb is heated to a temperature of about 85° C. While stirring the mixed solution, the oxalic acid solution, also heated up to 85° C., is added to the mixed solution. A mixture of co-precipitated oxalates of Y, Eu and Tb is filtered, washed and then dried in air at a temperature of about 120° C. for 12 hours. The dried oxalates are subjected to pyrolysis at a temperature of 800° C. for about one hour to obtain an oxide thereof. Then, 22 g of the oxide is admixed with 10 g of sodium carbonate, 10 g of sulfur and 3 g of $K_2PO_4$ and the mixture is charged into a quartz crucible with a lid for calcination at a temperature of 1180° C. for 3 hours. The calcined product is ground in a ball mill under the supply of water, washed with water and rinsed with dilute hydrochloric acid, and then caused to be precipitated in order for a supernatant liquid to be decanted. The decantation is repeated. The resulting material is passed through a sieve of 325 mesh for separation and dried to obtain the desired phosphor.

To determine the quantities of Tb and Pr contained in the raw material, a conventional solid mass analyzer can not be used because the quantity of the order of $10^{-1}$ ppm which should be determined in this invention is close to the detection limit of such an analyzer. For this reason, it is practically advantageous to use a method as will be described below.

An aqueous solution of $Tb^{3+}$ or $Pr^{3+}$ of a known predetermined concentration is prepared, and a predetermined quantity of this solution is added to a solution of nitric acid in which high purity $Y_2O_3$ is dissolved. Then a mixture of co-precipitated oxalates is prepared in the same manner as described above. The co-precipitated oxalates are subjected to pyrolysis at a temperature of 800° C. so as to be formed into an oxide and then heated to 1400° C. for two hours to obtain $Y_2O_3$ activated with Tb or Pr. When the $Y_2O_3$ is excited by an electron beam, light characteristic to $Tb^{3+}$ or $Pr^{3+}$ is emitted so that by plotting the relationship between the quantity of Tb or Pr added and the light intensity, a detected quantity curve can be obtained. The concentration of Tb or Pr contained in the raw material can be determined by exciting a calcined product obtained by heating the raw material $Y_2O_3$ for two hours at a temperature of 1400° C. with an electron beam to measure the intensity of light emitted by $Tb^{+3}$ or $Pr^{3+}$ and then comparing the measured light intensity with the detected quantity curve. Instead of directly heating $Y_2O_3$ at 1400° C., the $Y_2O_3$ can be converted into $Y_2O_2S$ without incorporating any activating agent. According to the last mentioned method the luminous efficiency of $Tb^{+3}$ and $Pr^{3+}$ and the detection efficiency can be improved.

The mixture of the red color phosphor $Y_2O_2S:Eu$, the green color phosphor ZnS:Cu, Au, Al, the blue color phosphor ZnS:Ag, Cl and the phosphor $YAlO_3:Ce$ for detecting index signals are applied, in a stripe pattern, onto the inner surface of a face plate and the coating, light exposure and development according to the well known method are repeated to obtain a color picture tube. The variation in the white color tone of the picture reproduced by this color picture tube is extremely small over the range of from low current to high current, whereby a picture of high quality can be obtained.

Thus, according to this invention, a $Y_2O_3S:Eu$ phosphor containing 0.01 to 3 ppm of either one or both of Tb and Pr is used as the red color phosphor so that it is possible to make uniform the current-brightness characteristics of tricolor phosphors and to obtain a high quality index type color picture tube wherein variation in the whiteness of the reproduced picture image is very small over the range of from low current to high current region.

What is claimed is:

1. In an index type color picture tube including a stripe type fluorescent screen having stripe-shaped phosphor layers for green blue and red color and a stripe-shaped phosphor layer for index detection, the improvement wherein the phosphor for said red color phosphor layer comprises a $Y_2O_2S:Eu$ phosphor containing 0.01 to 3 ppm of either one or both of Tb and Pr.

2. The color picture tube according to claim 1 wherein the phosphors for said green and blue color phosphor layers comprise zinc sulfide type phosphors.

* * * * *